United States Patent [19]
Sparks et al.

[11] Patent Number: 5,831,162
[45] Date of Patent: Nov. 3, 1998

[54] SILICON MICROMACHINED MOTION SENSOR AND METHOD OF MAKING

[75] Inventors: Douglas Ray Sparks; George Qin Jiang, both of Kokomo; Dan Wesley Chilcott, Sharpsville; Mark Billings Kearney, Kokomo, all of Ind.

[73] Assignee: Delco Electronics Corporation, Kokomo, Ind.

[21] Appl. No.: 785,683

[22] Filed: Jan. 21, 1997

[51] Int. Cl.$^6$ .............................. G01C 19/00; G01P 9/00
[52] U.S. Cl. ........................................................ 73/504.12
[58] Field of Search ................................ 73/493, 504.13, 73/504.12, 504.02, 431; 216/2, 18, 79; 437/225, 927, 921, 974

[56] References Cited

U.S. PATENT DOCUMENTS

| | | | |
|---|---|---|---|
| 5,226,321 | 7/1993 | Varnham et al. | 73/505 |
| 5,427,975 | 6/1995 | Sparks et al. | 437/79 |
| 5,450,751 | 9/1995 | Putty et al. | 73/504.18 |
| 5,465,620 | 11/1995 | Sanderson et al. | 73/504.12 |
| 5,546,644 | 8/1996 | Kakizaki et al. | 29/25.35 |
| 5,547,093 | 8/1996 | Sparks | 216/2 |
| 5,616,864 | 4/1997 | Johnson et al. | 73/504.04 |

OTHER PUBLICATIONS

Core et al., Fabrication Technology for an Integrated Surface–Micromachined Sensor, Solid State Technology (1993) pp. 39–44.

Funk et al., Surface–Micromachining of Resonant Silicon Structures, Transducers '95–Eurosensors IX, 8th Int'l Conf. (Jun. 1995) pp. 50–52.

Offenberg et al., Novel Process for Monolithic Integrated Accelerometer, Transducers '95–Eurosensors IX, 8th Int'l Conf. (Jun. 1995) pp. 589–592.

*Primary Examiner*—Hezron E. Williams
*Assistant Examiner*—Richard A. Moller
*Attorney, Agent, or Firm*—Jimmy L. Funke

[57] ABSTRACT

A method for making and vacuum packaging a silicon micromachined motion sensor, such as a gyroscope, at the chip level. The method involves micromachining a trench-isolated sensing element in a sensing chip, and then attaching a circuit chip to enclose the sensing element. Solder bumps serve to attach the circuit chip to the sensing chip, form a hermetic seal to enable vacuum-packaging of the sensor, and electrically interconnect the sensing chip with the circuit chip. Conductive runners formed on the enclosed surface of the circuit chip serve to electrically interconnect the sensing element with its associated sensing structures.

36 Claims, 5 Drawing Sheets

SILICON MICROMACHINED MOTION SENSOR AND METHOD OF MAKING

FIELD OF THE INVENTION

The present invention generally relates to micromachined semiconductor sensing devices. More particularly this invention relates to a method for making and packaging a motion sensor that includes a micromachined sensing chip and a circuit chip, in which electrical connections between the sensing and circuit chips is achieved by solder bumps formed on the circuit chip, which is assembled with the sensing chip as a capping chip.

BACKGROUND OF THE INVENTION

Motion sensors, which include gyroscopes and their components (e.g., angular rate sensors, yaw rate sensors and accelerometers), are widely used in VCR cameras and aerospace and automotive safety control systems and navigational systems. Examples of automotive applications include anti-lock braking systems, active suspension systems, supplemental inflatable restraint systems such as air bags and seat belt lock-up systems, and crash sensing systems. Automotive yaw rate sensors sense movement of an automobile about a vertical axis through its center of gravity, while accelerometers measure acceleration, or more accurately, the force that is exerted by a body as the result of a change in the velocity of the body. Both types of sensors operate on the basis of a moving body possessing inertia which tends to resist a change in velocity.

In the past, electromechanical and electronic motion sensors have been widely used in the automotive industry to detect an automobile's deceleration. More recently, sensors that employ an electrically-conductive, micromachined silicon sensing element have been developed which can be integrated with signal conditioning circuitry on silicon chips. As is known by those skilled in the art, micromachined silicon sensing elements are formed by etching a "sensing" chip formed of a single crystal silicon wafer or a polysilicon film on a silicon or glass handle wafer. In one configuration, the sensing element is formed by a resonating ring supported by arcuate springs extending radially from a post or hub. Circumscribing the ring is an electrode pattern composed of a number of individual electrodes. Finally, a capping wafer is often used to enclose the ring structure within an evacuated cavity defined by and between the sensing and capping wafers. Conductive runners formed on the sensing chip run beneath the edge of the capping chip to enable the electrodes to be electrically interconnected with appropriate signal conditioning circuitry and to provide a biasing voltage to the sensing element.

With the above construction, a sensor is able to detect rotary movement about the axis of the hub and, therefore, rotary movement about any chosen axis of an automobile. In operation, some of the electrodes are typically energized to drive the ring into resonance, others are energized to balance the resonant peaks of the rotary movement by inducing stiffness in the ring and springs, while other electrodes are used to capacitively sense rotary motion of the ring.

Sensors of the type described above are capable of extremely precise measurements, and are therefore desirable for use in automotive applications. However, the intricate sensing element required for such sensors must be precisely formed in order to ensure the proper operation of the sensor. For example, a sufficient gap must exist between the electrodes and the sensing element ring to prevent shorting, yet sufficiently close to maximize the capacitive output signal of the sensor. In addition, the electrodes must be spaced sufficiently apart along the perimeter of the ring in order to minimize crosstalk. In addition to these operational considerations, there is a continuing emphasis for motion sensors that are lower in cost and smaller in size, yet maintain high reliability and a high performance capability.

Therefore, it would be highly desirable if further advancements could be made toward reducing manufacturing complexity and costs without any loss in sensor performance, and preferably with improvements in performance.

SUMMARY OF THE INVENTION

It is an object of this invention to provide a motion sensor and a method for fabricating such a motion sensor.

It is another object of this invention that such a method yields a monolithic motion sensor structure, in which the motion sensor includes a sensing element on a sensing chip and conditioning circuitry on a capping wafer that encloses the sensing element.

It is yet another object of this invention that such a method entails making electrical connections between the conditioning circuitry and the sensing chip through electrical connections at the interface between the sensing and capping chips.

It is still another object that the motion sensor utilizes trench isolation in order to dielectrically isolate the various electrical structures of the motion sensor.

In accordance with a preferred embodiment of this invention, these and other objects and advantages are accomplished as follows.

According to the present invention, there is provided a motion sensor having a micromachined sensing element and sensing electrodes formed in the near-surface region of a silicon sensing chip, and a circuit chip on which is formed signal conditioning circuitry for the sensor. The sensing and circuit chips are configured such that, once bonded together, electrical connections are made between the conditioning circuitry and the sensing element and sensing electrodes without resorting to exterior electrical connections.

The sensing chip of this invention generally includes the sensing element and an array of electrodes that define an electrode pattern circumscribing the sensing element. A trench circumscribes the sensing element to physically isolate the sensing element from the electrodes. A contact is present on the sensing chip and is electrically connected to the sensing element. The circuit chip is attached to the sensing chip so as to enclose the sensing element between the circuit chip and the sensing chip. A second contact is present on the circuit chip and registered with the bond pad on the sensing chip in order to electrically connect the sensing element to the circuit chip. Additional contacts are also present on the circuit chip and are electrically connected to the electrodes on the sensing chip. Finally, conductive runners are present on the circuit chip to electrically connect the contacts on the circuit chip to the integrated circuit and, if necessary, to each other.

In a preferred embodiment, the motion sensor further includes a seal that circumscribes the electrode pattern so as to hermetically enclose the sensing element between the circuit chip and the sensing chip. The seal is preferably formed by a continuous bead of solder. The solder for the seal can be simultaneously deposited with solder used to form the electrical connections between the contacts on the sensing and circuit chips.

Also in a preferred embodiment, the sensing element comprises a hub supporting the sensing element on the sensing chip, a plurality of spring members extending radially from the hub, and a ring circumscribing the spring members and supported by the spring members. The trench circumscribing the sensing element separates the ring from the electrodes. To reduce crosstalk between the electrodes, the trench can be formed to surround each of the electrodes, such that each of the electrodes is a salient feature on the sensing chip, and adjacent electrodes are dielectrically isolated by a portion of the trench.

The method for fabricating the sensor of this invention generally entails the steps of forming the sensing element, electrodes, trench and contacts for the sensing chip, and forming the circuit chip and its signal conditioning circuitry, contacts and conductive runners. Importantly, the contacts on the circuit chip are located so as to register with the appropriate contacts on the sensing chip. Preferably, the solder used to form the seal and make the electrical connections between the contacts is then deposited on one of the sensing and circuit chips. Thereafter, the circuit chip is attached to the sensing chip so as to enclose the sensing element between the circuit chip and the sensing chip, and simultaneously register and electrically connect the contacts on the circuit chip with the contacts on the sensing chip.

From the above, it can be appreciated that the present invention provides a motion sensor characterized by having its inter-chip electrical connections formed between the chips, instead of exterior wiring or runners routed from chip to chip. Furthermore, the method of this invention yields a micromachined motion sensor capable of achieving high reliability and high performance as a result of trench isolation between the sensing element and its sensing electrodes, and also between adjacent electrodes. Another advantage of this invention is that the resulting motion sensor can be fabricated to yield a relatively large sensing element within a relatively small sensor package.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
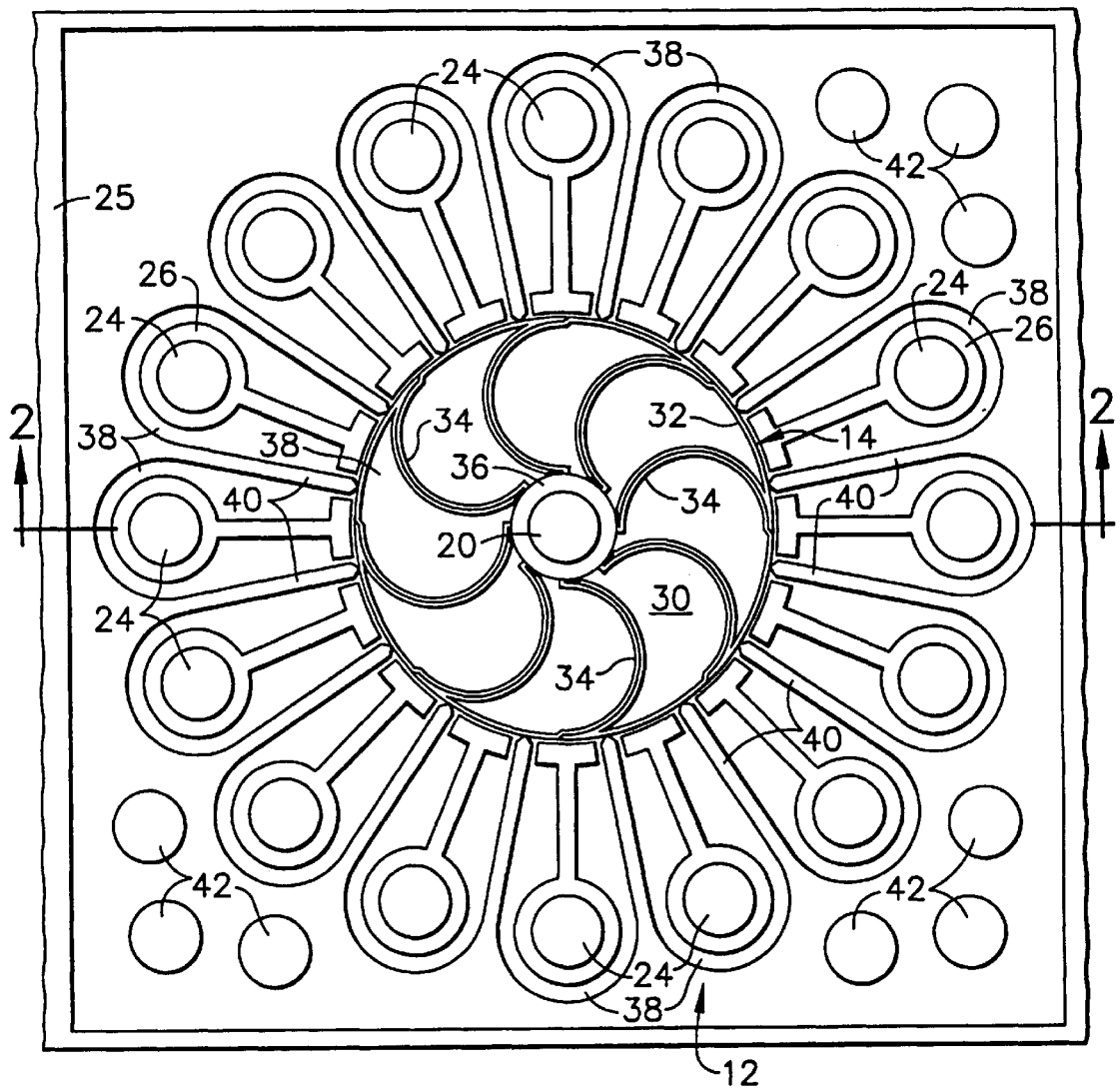
FIG. 1 shows a plan view of a monolithic sensing chip in accordance with an embodiment of this invention.
Figure 2:
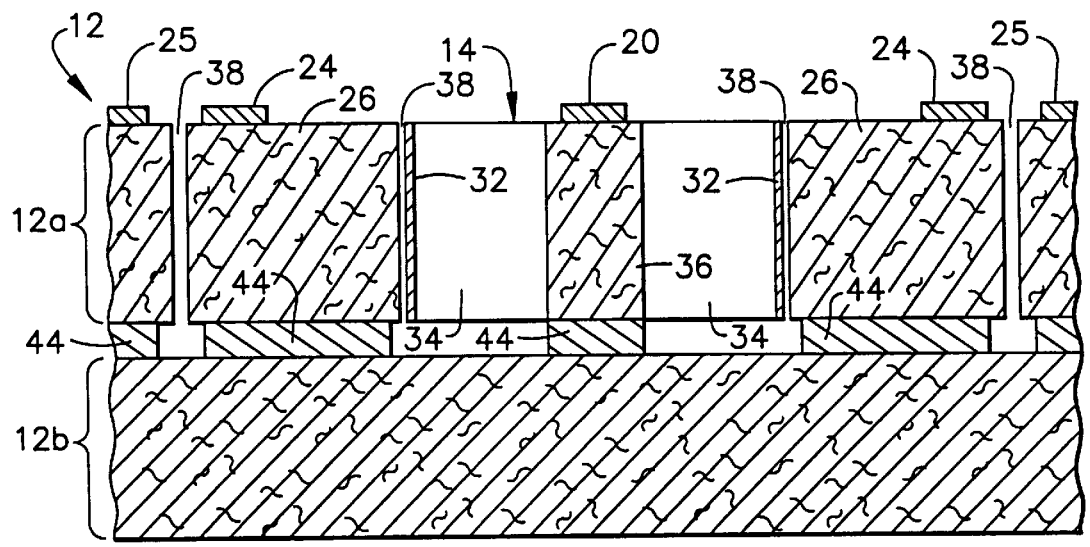
FIG. 2 is a cross-sectional along line 2—2 of the sensing chip of FIG. 1.
Figure 3:
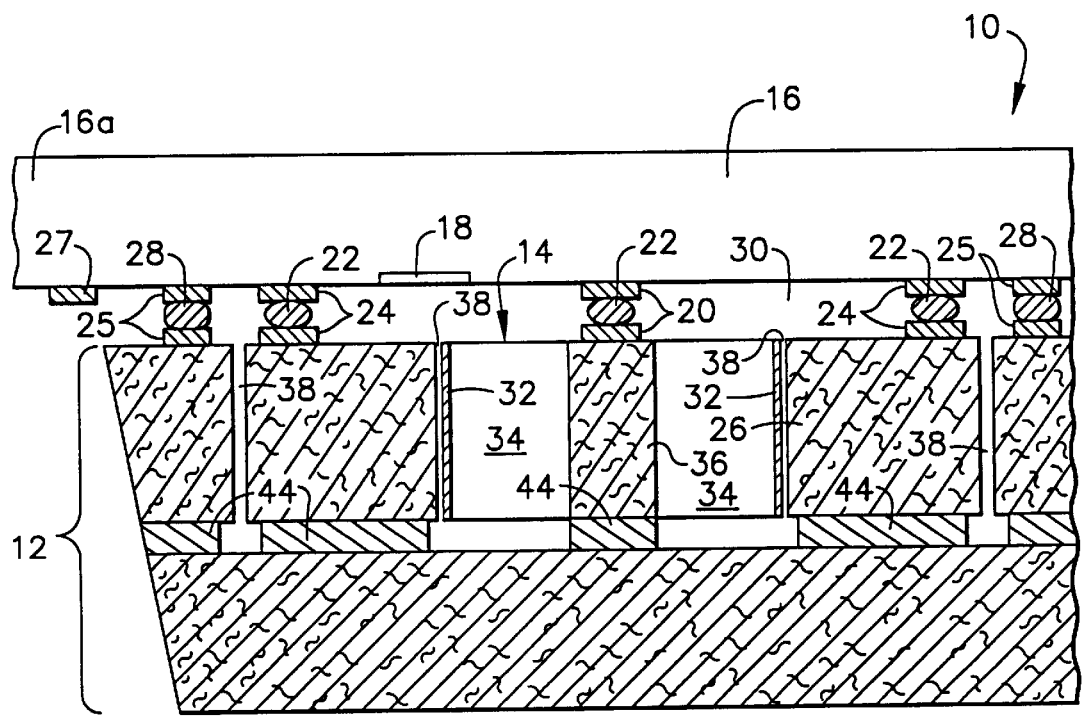
FIG. 3 shows, in cross-section, a circuit chip bonded to the sensing chip of FIG. 2.
Figure 5:
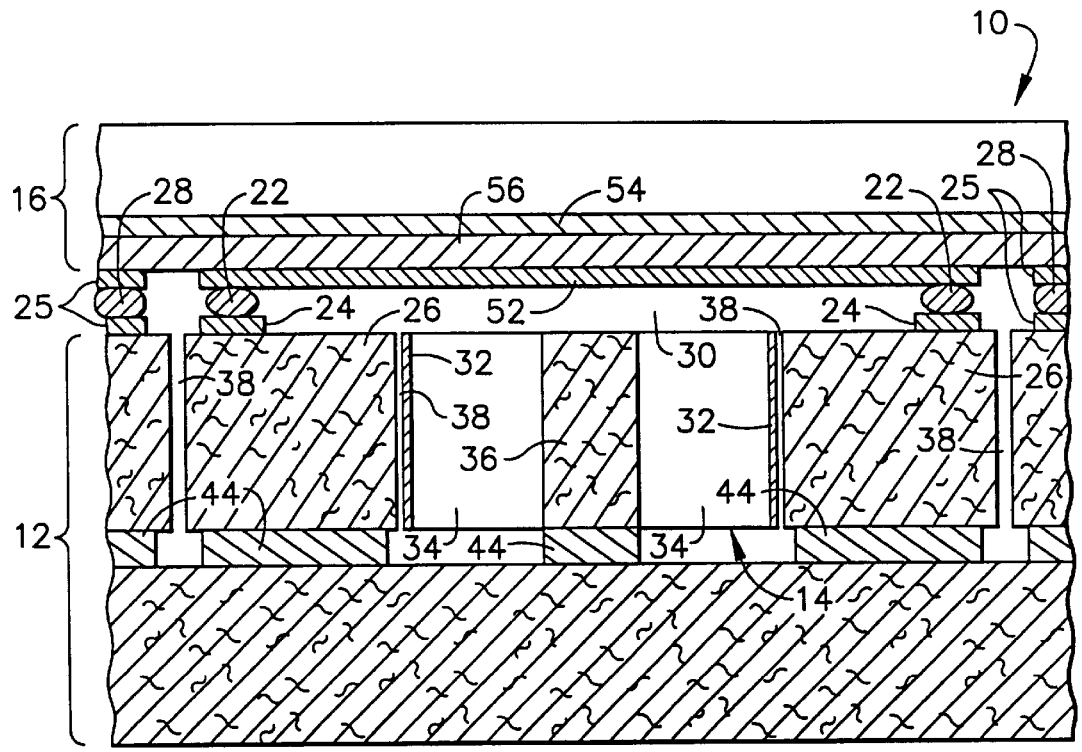
FIG. 5 is another cross-sectional view of a circuit chip bonded to the sensing chip of FIG. 1.

FIGS. 1 and 2 represent an all-silicon monolithic sensing wafer 12 for a motion sensor 10 shown in FIGS. 3 and 5, all of which are in accordance with the present invention. As illustrated, the sensor 10 includes a micromachined sensing element 14 formed in the sensing wafer 12, and a circuit wafer 16 bonded to the sensing wafer 12 so as to enclose the sensing element 14. In accordance with this invention, conditioning circuitry 18 for the sensing element 14 is formed on the circuit wafer 16. Contacts, such as the bond pad 20 shown, are present on the sensing and circuit wafers 12 and 16 and enable the conditioning circuitry 18 and the sensing element 14 to be electrically interconnected with solder bumps 22. In addition, bond pads 24 formed on the circuit wafer 16 enable electrodes 26 formed on the sensing wafer 12 to be electrically interconnected to the conditioning circuitry 18 with solder bumps 22. Finally, according to a preferred aspect of this invention, a seal 28 is formed by a continuous bead of solder on a bond pad 25 that completely surrounds the sensing element 14 and electrodes 26. The seal 28 forms a hermetic seal between the sensing and circuit wafers 12 and 16, thus enabling the sensing element 14 to be enclosed in an evacuated cavity 30 defined between the wafers 12 and 16.

As shown in FIG. 1, the sensing element 14 is formed by a ring 32 that is supported by a number of arcuate springs 34 extending from a center post 36. As best seen in FIG. 1, the electrodes 26 form an electrode pattern that circumscribes the ring 32 without physically contacting the ring 32. The ring 32 and the electrodes 26 are formed to be electrically conductive, as will be explained below, enabling the ring 32 to form a capacitor with each of the electrodes 26 when a voltage potential is present. In a preferred embodiment, some of the electrodes 26 are energized to drive the ring 32 into resonance, others are energized to balance the resonant peaks of the rotary movement by inducing stiffness in the ring 32 and springs 34, while the remaining electrodes 26 are used to capacitively sense a signal generated from the ring 32 as a result of being subjected to rotary motion. With this construction, the sensor 10 is able to detect rotary movement about the vertical axis through the center post 16 and, therefore, rotary movement about an axis of a body, such as an automobile, to which the sensor 10 is mounted. Those skilled in the art will appreciate that, though described in terms of a motion sensor, the structure of FIGS. 1–3 and its method of manufacture can also be adapted for use as an accelerometer.

As shown in FIGS. 1–3 and 5, the sensing element 14 and each of the electrodes 26 are defined in a near-surface region of the sensing wafer 12 by a trench 38. As such, the sensing element 14 and the electrodes 26 are freestanding conductive structures of the sensing wafer 12. To facilitate their fabrication and maximize spacing therebetween, the electrodes 26 are preferably formed to have the shape shown in FIG. 1. The shape of the electrodes 26 is useful to avoid shorting between the ring 32 and the solder 22 forming the connections between the bond pads 24 of the sensing and circuit wafers 12 and 16. The larger solder bump bond pad 24 is located away from the ring 32, while a thinner radial extension extends toward the ring 32. The radial extension maximizes the width of the trench 38 between electrodes 26 in the region of the ring 32 as compared to the gap between each electrode 26 and the ring 32, with the result that crosstalk and parasitic capacitance between the electrodes 26 is significantly reduced. The inner radial end of each electrode 26 is preferably T-shaped as shown to increase the capacitive plate area, or otherwise to increase the capacitive signal produced between the ring 32 and the electrodes 26. A conductive strip (not shown) can be formed along the radial extension of each electrode 26 to reduce parallel resistance.

As more readily seen in FIGS. 2, 3 and 5, the sensing element 14 and the electrodes 26 are also dielectrically isolated by the trench 38, as a result of the trench 38 extending down to a dielectric sublayer 44, e.g., a layer of silicon oxide or silicon nitride within the sensing wafer 12. As such, the sensing element 14, electrodes 26 and the seal 28 surrounding the electrodes 26 are both physically and electrically isolated from each other. The electrical connections provided by the solder bumps 22 between the bond pads 20 and 24 on the sensing and circuit wafers 12 and 16 eliminate the conventional requirement for metal runners that provide conductive paths from the interior of the motion sensor 10 to an exterior region of the sensing wafer 12, where wire bond connections would typically be formed.

As is apparent from FIG. 1, unetched surface regions of the sensing wafer 12 define finger-like projections 40 having their terminal ends adjacent the ring 32. When the surface of the sensing wafer 12 is appropriately processed, and with the ends of the projections 40 closer to the ring 32 than the electrodes 26, the projections 40 can serve as g-stops that prevent the ring 32 from sticking to the electrodes 26 due to excessive lateral motion. The projections 40 are shown as being electrically interconnected to contacts 42, enabling the projections 40 to be held at approximately the same potential as the ring 32 so as to prevent the ring 32 from becoming electrostatically held by, and therefore irreparably shorted to, one of the electrodes 26 following fabrication of the sensor 10 or in the event the sensor 10 is subjected to an acceleration sufficiently high to deflect the ring 32 toward one of the electrodes 26.

The above structure yields a motion sensor 10 characterized by a monolithic construction. The relative physical dimensions indicated in the Figures are primarily for illustrated purposes and should not be construed as a restriction to the teachings of the present invention. Essentially, the size of the sensing element 14, sensing and circuit wafers 12 and 16, and the sensor 10 as a whole can vary considerably, with the process encompassed by this invention being most efficient if multiple sensors are simultaneously formed from a wafer stack that is subsequently sawed to separate individual sensors.

Figure 4A:
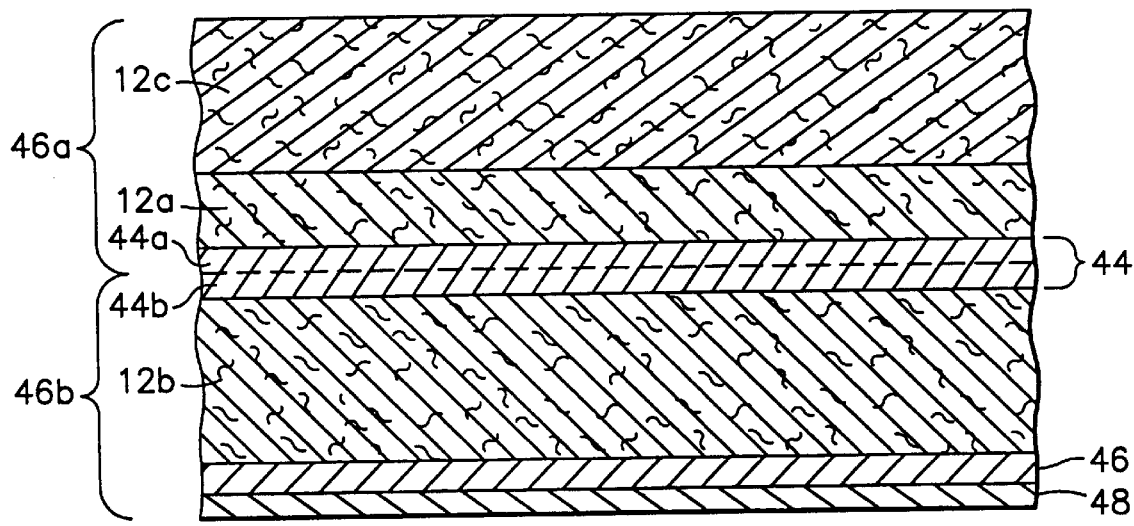
FIGS. 4A and 4B represent processing steps entailed in the fabrication of the sensing chip of FIGS. 1–3.
Figure 4B:
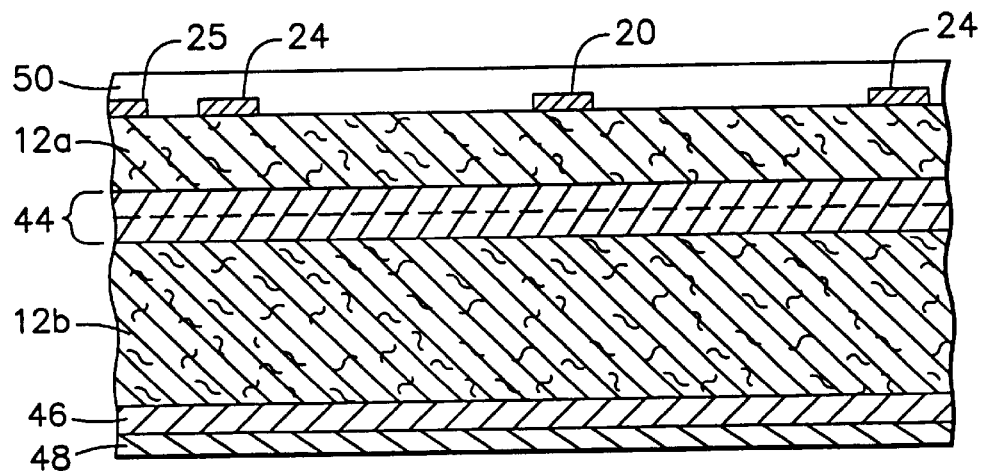

Processing steps for the fabrication and assembly of the sensing wafer 12 of FIGS. 1 and 2 are represented in FIGS. 4A and 4B, which represent the same cross-section of the sensing wafer 12 shown in FIG. 2. With reference to FIG. 2, the sensing wafer 12 is shown as being comprised of a heavily-doped silicon region 12a over a substrate 12b. The sensing element 14, electrodes 26 and projections 40 are formed from the silicon region 12a in order to be electrically conductive. The silicon region 12a may be single-crystal or polycrystalline, and doped either P+ or N+ depending on the type of silicon etching used to form the trench 38. The substrate 12b may be a silicon or glass. If the substrate 12b is silicon, the dielectric sublayer 44 is silicon oxide to provide a bond interface and an etch stop between the silicon region 12a and the substrate 12b, as will be explained below. It is also foreseeable that the sublayer 44 could be silicon nitride. If the substrate is glass, such as PYREX 7740, the sublayer 44 is unnecessary as an etch stop or to form the bond between the silicon region 12a and substrate 12b.

With reference to FIG. 4A, a suitable process for fabricating the sensing wafer 12 involves bonding together two silicon wafer slices 46a and 46b. The upper wafer slice 46a includes the heavily-doped silicon region 12a and a lightly-doped region 12c that will be subsequently removed by etching. The silicon region 12a may be a diffused layer or an epitaxially-grown layer, or a combination of both. Alternatively, it is foreseeable that the entire wafer 46a could be heavily doped to yield the silicon region 12a required by the sensing wafer 12. The second wafer 46b includes a lightly-doped region that forms the substrate 12b. In a preferred embodiment, the second wafer 46b also has a thin heavily-doped silicon layer 46 that can later serve as a ground plane for the motion sensor 10, and an oxide layer 48 that protects the silicon layer 46 during etching. Finally, each of the wafers 46a and 46b further includes an oxide layer 44a and 44b that, once the wafers 46a and 46b are bonded together, form the dielectric sublayer 44 of the sensing wafer 12. For the embodiment in which the heavily-doped silicon region 12a is a diffused layer using boron as the dopant, oxidation of the surface of the silicon region 12a to form the oxide layer 44a causes the doping profile in the wafer 46a to be more uniform, which reduces the tendency for warpage of the micromachined sensing element 14 formed from the silicon region 12a.

FIG. 4B shows the lightly-doped region 12c removed from the wafer 46a, the bond pads 20, 24 and 25 formed on the exposed surface of the silicon region 12a, and an oxide mask 50 overlying the silicon region 12a and bond pads 20, 24 and 25. The oxide mask 50 is then patterned to allow the trench 38 to be formed by a high aspect ratio anisotropic etch in accordance with known etching techniques. FIG. 2 represents the result of performing the etching step and removing the oxide mask 50. The etching process is carried out such that the trench 38 forms the capacitive structures that include the ring 32, the adjacent wall portions of the electrodes 26, and the gaps therebetween. As can be seen from FIG. 1, the etching process also serves to form the springs 34.

As illustrated in FIG. 3, the etching process can also be used to remove peripheral regions of the sensing wafer 12 to enable access to a portion 16a of the circuit wafer 16 on which one or more bond pads 27 are formed. These bond pads 27 are electrically connected to the integrated circuit 18, and serve as connection sites with which the motion sensor 10 can be wire bonded to its exterior packaging (not shown).

Thereafter, the oxide sublayer 44 exposed at the bottom of the trench 38 can be selectively etched, such that the sensing element 14 is undercut as seen from FIG. 2. The result of this etching process is the creation of the post 36, which enables the sensing element 14 to resonate. A suitable etching technique for the oxide sublayer 44 is to employ a buffered solution of dilute hydrofluoric acid (HF).

As an alternative to the above, the sensing element 14 can be formed entirely from a heavily-doped polysilicon layer grown on top of the oxide sublayer 44 if the substrate 12b is silicon, or directly on the substrate 12b if the substrate 12b is glass. As those skilled in the art will appreciate, use of heavily-doped polysilicon as the sensing element 14 would require annealing at temperatures of about 1100° C. for several hours to reduce stresses induced in the polysilicon during doping. As noted previously, an alternative would be to grow amorphous silicon or a combination epitaxial-polysilicon layer using known deposition methods.

Processing of the circuit wafer 16 can proceed in accordance with conventional techniques to form suitable signal conditioning circuitry 18, as well as the bond pads 20, 24 and 25 for the sensing element 14, electrodes 26 and seal 28, respectively. The bond pads 20 and 24 are electrically interconnected by appropriate means to the conditioning circuitry 18. As represented in FIG. 5, metal runners 52 are formed on the lower surface of the circuit wafer 16, so as to be enclosed within the cavity 30 formed between the wafers 12 and 16. As shown, the runners 52 can serve to electrically interconnect bond pads 24 for certain paired electrodes 26 that serve as balance electrodes for the sensing element 14 if used as a gyroscope or yaw sensor. Any number of runners 52 can be formed to appropriately interconnect the other electrical structures of the sensing wafer 12, e.g., the sensing element 14, other electrodes 26 and g-stop projections 40, as may be necessary for the desired operation of the sensor 10. As an alternative to metal runners 52, polysilicon or diffused conductors could be used in accordance with known practices in the art.

As also shown in FIG. 5, the circuit wafer 16 may be formed to include a ground plane 54 of metal or polysilicon that is insulated from the bond pads 20, 24 and 25 by a dielectric layer 56, such as an oxide. The presence of the ground plane 54 greatly reduces crosstalk and parasitic signals between the bond pads 20, 24 and 25 and the runners 52.

Finally, to obtain the motion sensor 10 shown in FIGS. 3 and 5, the sensing and circuit wafers 12 and 16 are bonded together. Bonding is preferably done under vacuum with a fluxless solder, eutectic bonding or through the compression of a conductive material between the bond pads 20, 24 and 25 on both wafers 12 and 16. Compression bonding can be performed at room or elevated temperatures, and be assisted by forming the bond pads 20, 24 and 25 over bumps of silicon nitride or oxide, which assist in concentrating the compression force at the center of the bond pads 20, 24 and 25. As is evident from FIGS. 3 and 5, the advantageous effect of forming inter-chip connections with the bond pads 20 and 24 and solder 22 is the elimination of metal runners that are conventionally required to provide conductive paths from the interior of the motion sensor 10 to an exterior region of the sensing wafer 12, where wire bond connections are required to make the inter-chip connections between the sensing wafer 12 and the circuit wafer 16.

Figure 6:
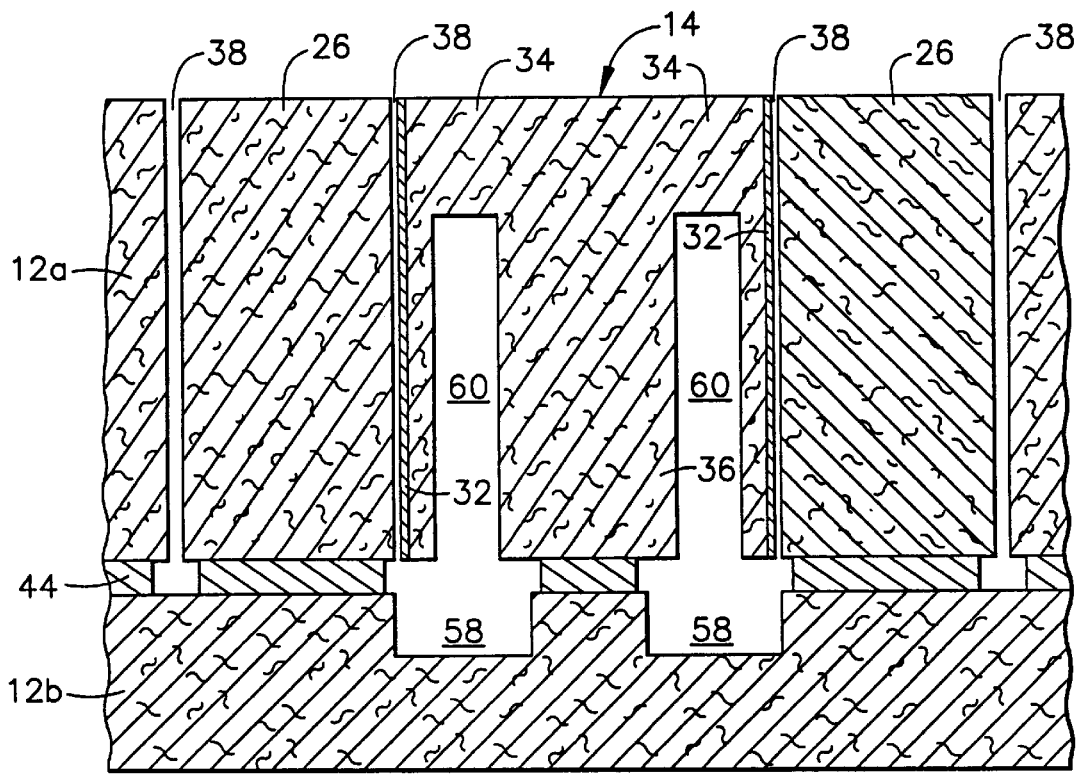
FIG. 6 is a cross-sectional view of additional embodiments for the sensing chip of FIG. 1.

FIG. 6 is an alternative embodiment of this invention, in which a shallow annular-shaped cavity 58 is etched into the surface of the substrate 12b prior to bonding the wafers 46a and 46b (FIGS. 4A and 4B) together. During the subsequent trench etch into the silicon region 12a, the trench 38 extends to the cavity 58, with the result that a larger vertical gap is formed between the sensing element 14 and the underlying substrate 12b, thereby reducing the likelihood of stiction between the sensing element 14 and substrate 12b.

FIG. 6 shows another optional feature of this invention, in which the heavily-doped silicon region 12a is thicker than that represented for FIGS. 2, 3 and 5. As shown, an annular-shaped cavity 60 is formed in the surface of the silicon region 12a prior to the wafers 46a and 46b being bonded together. The cavity 60 serves to reduce the stiffness of the springs 34 of the sensing element 14, as may be desired if the silicon region 12a is relatively thick as shown. The effect is that the sensing ring 32 has a tubular shape, as can be appreciated from FIG. 6. The greater surface area of the ring allows the bias voltage for the ring 32 to be greatly reduced, since the capacitive signal produced between the ring 32 and the electrodes 26 is proportional to voltage and the capacitive plate area. Alternatively, the trench 38 could be patterned to yield comb-like features on the sensing element 14 for sensing acceleration. Such a sensing element is disclosed in Funk et al., *Surface-Micromachining of Resonant Silicon Structures*, Transducers '95—Eurosensors IX, The 8th International Conference on Solid State Sensors and Actuators, and Eurosensors IX (Jun. 25–29, 1995) pp. 50–52.

Figure 7:
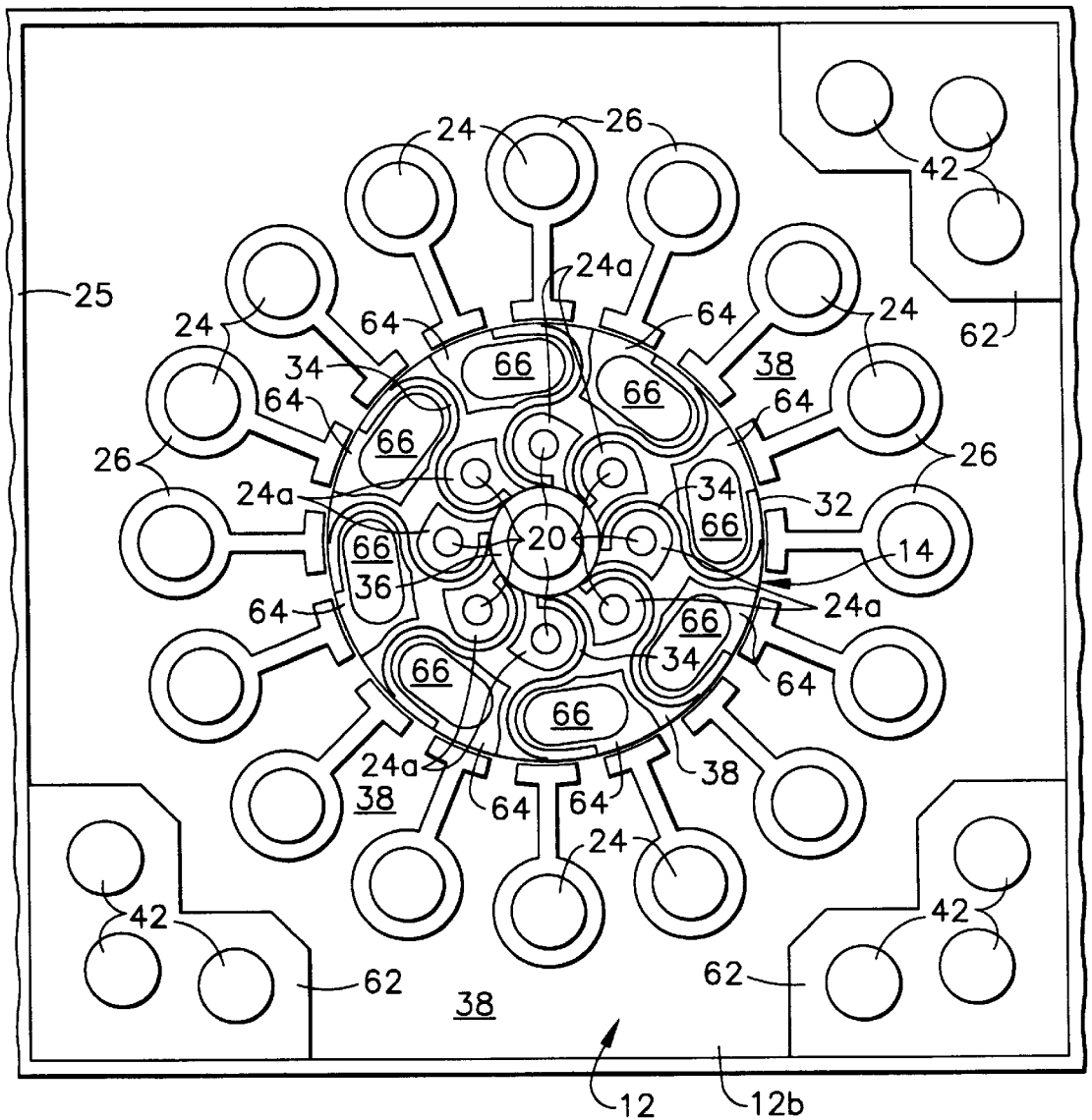
FIG. 7 shows a plan view of a monolithic sensing chip in accordance with a second embodiment of this invention.

FIG. 7 is a plan view of another embodiment for the sensing wafer 12 of this invention, in which the surface area of the sensing wafer 12 subjected to the trench etch is significantly increased, such that the only portions of the silicon region 12a remaining include the sensing element 14, the electrodes 26 and raised regions 62 for the bond pads 42. According to this aspect of the invention, removal of the heavily-doped silicon region 12a to the extent shown will have the greatest impact on reducing parasitic lateral capacitance within the sensing wafer 12.

FIG. 7 also illustrates the situation in which bond pads 20 for the sensing element 14 are formed on electrodes 24a between adjacent pairs of springs 34. In this embodiment, the bond pads 20 can be electrically connected to the sensing element 14 through a heavily-doped region in the substrate 12b. By offsetting the bond pads 20 in this manner, complications caused by a thermal mismatch between the solder 22 and sensing element 14 are avoided.

As also shown in FIG. 7, multiple inner electrodes 64 can be formed beneath the ring 32 and between adjacent springs 34. For this purpose, the shape of the springs 34 is preferably modified to the S-shape shown in FIG. 7. Each of the inner electrodes 64 is preferably defined by the trench etch, and has a bond pad 66 similar to the bond pads 20 for the sensing element 14. The use of inner electrodes 64 in combination with the outer electrodes 26 is advantageous to obtain differential signals compensate for changes in capacitance due to thermal expansion of the ring 32, and for increasing the sensing area, and hence the capacitive signal, obtained from the sensing element 14.

While conventional silicon processing materials can be employed to form the sensor 10 of this invention, other materials can be used, including elemental and compound semiconductor materials, or layers of conducting and insulating materials. As those skilled in the art will appreciate, the choice of materials will determine the appropriate processes for forming selective regions of conductivity and resistance in the wafers. In addition, while the polarity of p-type and n-type regions in the wafers are generally interchangeable, each conductivity type incurs tradeoffs that would be appreciated and accommodated by one skilled in the art. Consequently, it is foreseeable that the present invention can be utilized to encompass a multitude of applications through the addition or substitution of other processing or sensing technologies.

While our invention has been described in terms of a preferred embodiment, other forms could be adopted by one skilled in the art. Accordingly, the scope of our invention is to be limited only by the following claims.

The embodiments of the invention in which an exclusive property or privilege is claimed are defined as follows:

1. A motion sensor comprising:

a sensing chip having a micromachined sensing element with an axis of rotation;

electrodes on the sensing chip and forming an electrode pattern that circumscribes the sensing element;

a trench in the sensing chip so as to circumscribe the sensing element and thereby physically isolate the sensing element from the electrodes;

a first contact on the sensing chip and electrically connected to the sensing element;

a circuit chip attached to the sensing chip so as to form an enclosure for the sensing element between the circuit chip and the sensing chip, the circuit chip having an integrated circuit;

a second contact on the circuit chip and within the enclosure, the second contact being registered with the first contact so as to be electrically connected to the first contact;

a third contact on the circuit chip and within the enclosure, the third contact being registered with one of the electrodes so as to be electrically connected thereto; and conductive runners on the circuit chip and electrically connecting the second and third contacts to the integrated circuit.

2. A motion sensor as recited in claim 1 further comprising a seal circumscribing the electrode pattern so as to hermetically enclose the sensing element between the circuit chip and the sensing chip.

3. A motion sensor as recited in claim 2 wherein the seal is formed by solder.

4. A motion sensor as recited in claim 1 further comprising a plurality of contacts on the circuit chip and electrically connected to the electrodes.

5. A motion sensor as recited in claim 1 wherein the first contact is formed on the sensing element.

6. A motion sensor as recited in claim 1 wherein the first contact is physically spaced apart from the sensing element on the sensing chip, the motion sensor further comprising an electrical conductor electrically connecting the sensing element to the first contact.

7. A motion sensor as recited in claim 1 further comprising a cavity formed in the sensing chip beneath the sensing element so as to space the sensing element from the sensing chip in a direction parallel to the axis of rotation of the sensing element.

8. A motion sensor as recited in claim 1 further comprising a cavity formed in the sensing element such that the sensing element has a tubular shape.

9. A motion sensor as recited in claim 1 further comprising a post supporting the sensing element on the sensing chip, the sensing element comprising a plurality of spring members extending radially from the post, and a ring circumscribing the spring members and supported by the spring members.

10. A motion sensor as recited in claim 1 wherein the trench is formed on the sensing chip so as to surround each of the electrodes, whereby the electrodes are physically and electrically isolated from each other by the trench.

11. A motion sensor comprising:

a sensing chip having a surface;

an electrically-conductive micromachined sensing element comprising a post supporting the micromachined sensing element above the surface of the sensing chip, a plurality of spring members extending radially from the post, and a ring circumscribing the spring members and supported by the spring members, the micromachined sensing element having an axis of rotation through the post;

electrodes on the sensing chip and forming an electrode pattern that circumscribes the micromachined sensing element;

at least one trench in the sensing chip and surrounding the electrodes and the micromachined sensing element so as to physically and electrically isolate the electrodes from each other and the micromachined sensing element;

a first contact on the sensing chip and electrically connected to the micromachined sensing element;

a circuit chip attached to the sensing chip so as to enclose the micromachined sensing element between the circuit chip and the sensing chip, the circuit chip having an integrated circuit;

a second contact on the circuit chip and electrically connected to the first contact;

a third contact on the circuit chip and electrically connected to one of the electrodes; and conductive runners on the circuit chip and electrically connecting the second and third contacts to the integrated circuit.

12. A motion sensor as recited in claim 11 further comprising a seal circumscribing the electrode pattern so as to hermetically enclose the micromachined sensing element between the circuit chip and the sensing chip.

13. A motion sensor as recited in claim 12 wherein the seal is formed by solder.

14. A motion sensor as recited in claim 11 further comprising a plurality of contacts on the circuit chip and electrically connected to the electrodes.

15. A motion sensor as recited in claim 11 wherein the first contact is formed on the micromachined sensing element.

16. A motion sensor as recited in claim 11 wherein the first contact is formed on the surface of the sensing chip between an adjacent pair of the spring members, the motion sensor further comprising an electrical conductor electrically connecting the micromachined sensing element to the first contact.

17. A motion sensor as recited in claim 11 further comprising a cavity formed in the surface of the sensing chip beneath the micromachined sensing element so as to space the micromachined sensing element from the sensing chip in a direction parallel to the axis of rotation of the micromachined sensing element.

18. A motion sensor as recited in claim 11 further comprising a cavity formed in the micromachined sensing element such that the micromachined sensing element has a tubular shape.

19. A motion sensor as recited in claim 11 wherein the at least one trench is a continuous trench that surrounds the electrodes and the micromachined sensing element.

20. A motion sensor as recited in claim 11 wherein the electrodes are adjacently disposed on the sensing chip such that the electrode pattern comprises adjacent pairs of the electrodes, and wherein the at least one trench forms a g-stop between each adjacent pair of the electrodes.

21. A method for forming a motion sensor, the method comprising the steps of:

forming in a sensing chip a micromachined sensing element having an axis of rotation, electrodes that define an electrode pattern that circumscribes the sensing element, a trench that circumscribes the sensing element and thereby physically isolates the sensing element from the electrodes, and a first contact electrically connected to the sensing element;

forming on a circuit chip an integrated circuit, second and third contacts, and conductive runners that electrically connect the second and third contacts to the integrated circuit; and attaching the circuit chip to the sensing chip so as to enclose the sensing element and the first, second and third contacts between the circuit chip and the sensing chip, electrically connect the second contact with the first contact, and electrically connect the third contact to one of the electrodes.

22. A method as recited in claim 21 wherein the sensing chip comprises a heavily-doped silicon layer overlying a handle layer, the sensing element being etched from the heavily-doped silicon layer.

23. A method as recited in claim 22 wherein the heavily-doped silicon layer is an epitaxial layer.

24. A method as recited in claim 22 wherein the handle layer is formed of a glass material.

25. A method as recited in claim 22 wherein the heavily-doped silicon layer and the handle layer are separate by an oxide layer.

26. A method as recited in claim 22 wherein the heavily-doped silicon layer and the handle layer are formed by first and second wafers that are bonded together.

27. A method as recited in claim 26 further comprising the step of etching a cavity in the handle layer prior to bonding the first and second wafers, the trench that circumscribes the sensing element being contiguous with the cavity after the first and second wafers are bonded together.

28. A method as recited in claim 26 further comprising the step of etching a cavity in the heavily-doped layer prior to bonding the first and second wafers, the cavity being located within the sensing element such that the sensing element has a tubular shape.

29. A method as recited in claim 21 further comprising the step of forming a seal that circumscribes the electrode pattern so as to hermetically enclose the sensing element between the circuit chip and the sensing chip.

30. A method as recited in claim 29 wherein the seal is formed by solder.

31. A method as recited in claim 30 further comprising the step of forming electrical connections with solder between the second contact and the first contact and between the third contact and one of the electrodes.

32. A method as recited in claim 21 further comprising a plurality of contacts on the circuit chip electrically connected to the electrodes.

33. A method as recited in claim 21 wherein the first contact is formed on the sensing element.

34. A method as recited in claim 21 wherein the first contact is formed on the sensing chip so as to be physically spaced apart from the sensing element, the method further comprising the step of forming an electrical conductor that electrically connects the sensing element to the first contact.

35. A method as recited in claim 21 further comprising the step of forming a post that supports the sensing element on the sensing chip, and wherein the sensing element is formed to have a plurality of spring members extending radially from the post, and a ring circumscribing the spring members and supported by the spring members.

36. A method as recited in claim 21 wherein the trench is formed on the sensing chip so as to surround each of the electrodes, whereby the electrodes are physically and electrically isolated from each other by the trench.

* * * * *